US012795422B2

(12) United States Patent
Matsumura et al.

(10) Patent No.: US 12,795,422 B2
(45) Date of Patent: Nov. 10, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 364 days.

(21) Appl. No.: 18/274,275

(22) PCT Filed: Jan. 24, 2022

(86) PCT No.: PCT/JP2022/002335
§ 371 (c)(1),
(2) Date: Jul. 26, 2023

(87) PCT Pub. No.: WO2022/163557
PCT Pub. Date: Aug. 4, 2022

(65) Prior Publication Data

US 2024/0098541 A1 Mar. 21, 2024

(30) Foreign Application Priority Data

Jan. 28, 2021 (JP) ................................ 2021-012255

(51) Int. Cl.
*H04W 24/10* (2009.01)
*H04L 5/00* (2006.01)

(52) U.S. Cl.
CPC ............ *H04W 24/10* (2013.01); *H04L 5/005* (2013.01)

(58) Field of Classification Search
CPC ...... H04W 24/10; H04W 72/04; H04L 5/005; H04L 5/001; H04L 5/0035; H04L 5/0057
See application file for complete search history.

(56) References Cited

U.S. PATENT DOCUMENTS

| | | | |
|---|---|---|---|
| 2013/0051322 | A1 | 2/2013 | Barbieri et al. |
| 2019/0150011 | A1 | 5/2019 | Shoji et al. |

(Continued)

FOREIGN PATENT DOCUMENTS

| | | | |
|---|---|---|---|
| JP | 2016-007063 | A | 1/2016 |
| WO | 2017/195724 | A1 | 11/2017 |
| WO | 2020/090122 | A1 | 5/2020 |

OTHER PUBLICATIONS

International Search Report issued in PCT/JP2022/002335 on Apr. 5, 2022 (2 pages).

(Continued)

*Primary Examiner* — Chuong A Ngo
(74) *Attorney, Agent, or Firm* — Osha Bergman Watanabe & Burton LLP

(57) ABSTRACT

It is possible to perform appropriate CSI reporting for a non-serving cell. A terminal according to one aspect of the present disclosure includes a receiving section that receives separate channel state information (CSI) report configurations for respective reference signals of a reference signal of a serving cell and a reference signal of a non-serving cell or that receives one CSI report configuration including both a reference signal of the serving cell and a reference signal of the non-serving cell, and a control section that controls CSI reporting on the basis of the separate CSI report configurations or the one CSI report configuration.

4 Claims, 13 Drawing Sheets

(56) References Cited

U.S. PATENT DOCUMENTS

2022/0046458 A1* 2/2022 Zhu ........................ H04B 7/022
2022/0216904 A1* 7/2022 Zhu ...................... H04B 7/0695

OTHER PUBLICATIONS

Written Opinion of the International Searching Authority issued in PCT/JP2022/002335 on Apr. 5, 2022 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

```
ServingCellConfig ::=                SEQUENCE {
    ...
    trp-ToReleaseList           SEQUENCE (SIZE (1..maxNrofTRPs)) OF TRP-Id                  OPTIONAL,
    trp-ToAddModList            SEQUENCE (SIZE (1..maxNrofTRPs)) OF TRP-Config            OPTIONAL,
}
TRP-Config ::=         SEQUENCE {
       trp-Id                                    TRP-Id
    physCellId                          PhysCellId
    ssb-PositionsInBurst                CHOICE {
        shortBitmap                         BIT STRING (SIZE (4)),
        mediumBitmap                        BIT STRING (SIZE (8)),
        longBitmap                          BIT STRING (SIZE (64))
    }
    ssb-periodicityServingCell         ENUMERATED { ms5, ms10, ms20, ms40, ms80, ms160, spare2, spare1 }
}
```

FIG. 3

```
QCL-Info-r17 ::=                        SEQUENCE {
    cell                                ServCellIndex
    trp                                                      TRP-ID
    bwp-Id                              BWP-Id
    referenceSignal                     CHOICE {
        csi-rs                              NZP-CSI-RS-ResourceId,
        ssb                                 SSB-Index
        }
    },
    qcl-Type                            ENUMERATED {typeA, typeB, typeC, typeD},
    ...
}
```

FIG. 4

```
QCL-Info ::=                    SEQUENCE {
    cell                            ServCellIndex         OPTIONAL,   -- Need R
    bwp-Id                          BWP-Id                OPTIONAL, -- Cond CSI-RS-Indicated
    referenceSignal                 CHOICE {
        csi-rs                          NZP-CSI-RS-ResourceId,
        ssb                             SEQUENCE {
            ssb-index                       SSB-Index,
            physCellId                      PhysCellId
        }
    },
    qcl-Type                        ENUMERATED {typeA, typeB, typeC, typeD},
    ...
}
```

FIG. 5

FIG. 7A

```
CSI-ResourceConfig ::=      SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList  SEQUENCE (SIZE (1..maxNrofNZP-
CSI-RS-ResourceSetsPerConfig)) OF NZP-CSI-RS-ResourceSetId

OPTIONAL, -- Need R
            csi-SSB-ResourceSetList     SEQUENCE (SIZE (1..maxNrofCSI-
SSB-ResourceSetsPerConfig)) OF CSI-SSB-ResourceSetId  OPTIONAL  -- Need R
        },
        csi-IM-ResourceSetList      SEQUENCE (SIZE (1..maxNrofCSI-IM-
ResourceSetsPerConfig)) OF CSI-IM-ResourceSetId
    },

    bwp-Id                      BWP-Id,
    resourceType                ENUMERATED { aperiodic, semiPersistent,
periodic },
    ...
}
```

FIG. 7B

```
CSI-SSB-ResourceSet ::=             SEQUENCE {
    csi-SSB-ResourceSetId               CSI-SSB-ResourceSetId,
    csi-SSB-ResourceList                SEQUENCE (SIZE(1..maxNrofCSI-SSB-
ResourcePerSet)) OF SSB-Index,
    ...
}
```

```
CSI-SSB-ResourceSet ::=            SEQUENCE {
    csi-SSB-ResourceSetId              CSI-SSB-ResourceSetId,
    newID/physCellId                   TRP-ID/PhysCellId
    csi-SSB-ResourceList               SEQUENCE (SIZE(1..maxNrofCSI-SSB-
ResourcePerSet)) OF SSB-Index,
    ...
}
```

FIG. 8

```
CSI-SSB-ResourceSet ::=              SEQUENCE {
    csi-SSB-ResourceSetId                CSI-SSB-ResourceSetId,
    csi-SSB-ResourceList                 SEQUENCE (SIZE(1..maxNrofCSI-SSB-ResourcePerSet)) OF SSB-Index,
    newIDsequence                        SEQUENCE (SIZE(1..maxNrofCSI-SSB-ResourcePerSet)) OF newID,
    ...
}
```

FIG. 9

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as “5th generation mobile communication system (5G),” “5G+(plus),” “6th generation mobile communication system (6G),” “New Radio (NR),” “3GPP Rel. 15 (or later versions),” and so on) are also under study.

In existing LTE systems (for example, 3GPP Rel. 8 to Rel. 14), a user terminal (User Equipment (UE)) transmits uplink control information (UCI) by using at least one of a UL data channel (for example, a Physical Uplink Shared Channel (PUSCH)) and a UL control channel (for example, a Physical Uplink Control Channel (PUCCH)).

CITATION LIST

Non-Patent Literature

Non-Patent Literature 1: 3GPP TS 36.300 V8.12.0 “Evolved Universal Terrestrial Radio Access (E-UTRA) and Evolved Universal Terrestrial Radio Access Network (E-UTRAN); Overall description; Stage 2 (Release 8),” April, 2010

SUMMARY OF INVENTION

Technical Problem

For future radio communication systems (for example, NR), for example, a case where a respective plurality of transmission/reception points (TRPs) (multiple TRPs) transmit separate control signals to a UE and where the multiple TRPs transmit data signals is under study. For a multi-master mode, a structure in which different physical cell IDs are configured for a plurality of TRPs is under study.

However, for NR specifications thus far, L1 (Layer 1) CSI reporting with a synchronization signal block (SSB) of a non-serving cell has not been fully studied. Accordingly, appropriate CSI reporting for the non-serving cell may fail to be performed.

Thus, an object of the present disclosure is to provide a terminal, a radio communication method, and a base station that can perform appropriate CSI reporting for a non-serving cell.

Solution to Problem

A terminal according to one aspect of the present disclosure includes a receiving section that receives separate channel state information (CSI) report configurations for respective reference signals of a reference signal of a serving cell and a reference signal of a non-serving cell or that receives one CSI report configuration including both a reference signal of the serving cell and a reference signal of the non-serving cell, and a control section that controls CSI reporting on the basis of the separate CSI report configurations or the one CSI report configuration.

Advantageous Effects of Invention

According to one aspect of the present disclosure, it is possible to perform appropriate CSI reporting for a non-serving cell.

BRIEF DESCRIPTION OF DRAWINGS

FIG. 3 is a diagram to show a first configuration example of RRC.

FIG. 4 is a diagram to show a second configuration example of RRC.

FIG. 5 is a diagram to show a third configuration example of RRC.

FIG. 7A is a diagram to show part of CSI resource configuration in RRC; FIG. 7B is a diagram to show part of a CSI-SSB resource set.

FIG. 8 is a diagram to show an example of CSI-SSB-ResourceSet in a first embodiment.

FIG. 9 is a diagram to show an example of CSI-SSB-ResourceSet in aspect 2-1.

DESCRIPTION OF EMBODIMENTS (CSI Reporting)

Figure 1A:
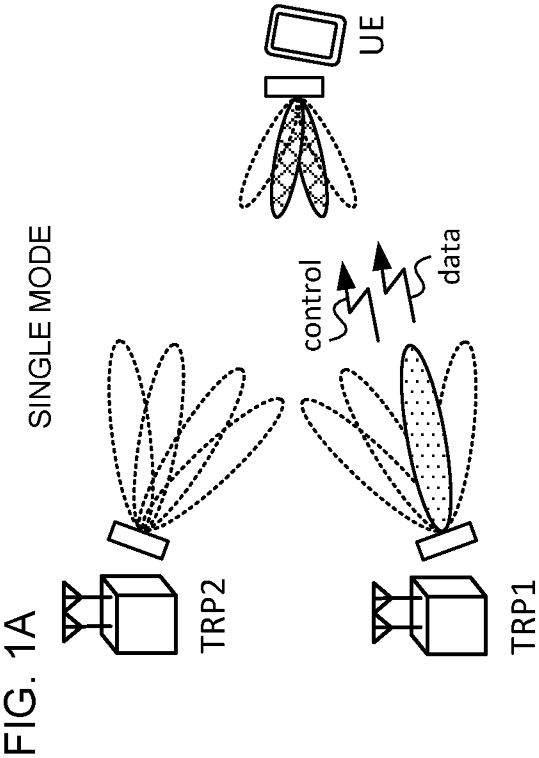
FIGS. 1A to 1D are each a diagram to show an example of a multi-TRP scenario.

In NR, a UE measures a channel state by using a certain reference signal (or resource for the reference signal), and feeds back (reports) channel state information (CSI) to a base station.

The UE may measure the channel state by using a channel state information reference signal (CSI-RS), a synchronization signal/broadcast channel (Synchronization Signal/Physical Broadcast Channel (SS/PBCH)) block, a synchronization signal (SS), a demodulation reference signal (DMRS), or the like.

A CSI-RS resource may include at least one of a non-zero power (NZP) CSI-RS and CSI-Interference Management (IM). The SS/PBCH block is a block including a synchronization signal (for example, a primary synchronization signal (PSS)), a secondary synchronization signal (SSS), and a PBCH (and a corresponding DMRS), and may be referred to as an SS block (SSB) or the like. An SSB index may be given to a temporal location of the SSB in a half frame.

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), Layer 1 (L1)-Reference Signal Received Power (RSRP) (reference signal received power in Layer 1), L1-Reference Signal Received Quality (RSRQ), an L1-Signal to Interference plus Noise Ratio (SINR), an L1-Signal to Noise Ratio (SNR), and the like.

The CSI may have a plurality of parts. A first part of the CSI (CSI part 1) may include information with a relatively small number of bits (for example, the RI). A second part of the CSI (CSI part 2) may include information with a relatively large number of bits (for example, the CQI), such as information determined on the basis of CSI part 1.

As a method for feeding back the CSI, (1) periodic CSI (P-CSI) reporting, (2) aperiodic CSI (A (AP)-CSI) reporting, (3) semi-persistent (semi-permanent) CSI reporting (SP-CSI) reporting, and the like are under study.

Information related to CSI reporting (which may be referred to as CSI report configuration information) may be notified to the UE by using higher layer signaling, physical layer signaling (for example, downlink control information (DCI)), or a combination of these. The CSI report configuration information may be configured by using, for example, an RRC information element "CSI-ReportConfig."

Here, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (MAC PDU), or the like. The broadcast information may be, for example, a master information block (MIB), a system information block (SIB), minimum system information (Remaining Minimum System Information (RMSI)), other system information (OSI), or the like.

For example, the CSI report configuration information may include information related to a reporting periodicity, offset, and the like, and these may be represented in certain units of time (units of slots, units of subframes, units of symbols, or the like). The CSI report configuration information may include a configuration ID (CSI-ReportConfigId). A parameter such as a type of CSI reporting method (whether or not the type is SP-CSI, or the like), a reporting periodicity, or the like may be identified by the configuration ID. The CSI report configuration information may include information (CSI-ResourceConfigId) indicating with which signal (or which signal resource) measured CSI is reported.

(Beam Management)

For Rel-15 NR thus far, a beam management (BM) method has been studied. In the beam management, beam selection based on L1-RSRP reported by the UE is under study. Changing (switching) a beam of a certain signal/channel may correspond to changing a (Transmission Configuration Indication state) for the signal/channel.

Note that a beam selected by the beam selection may be a transmit beam (Tx beam), or may be a receive beam (Rx beam). The beam selected by the beam selection may be a beam of the UE, or may be a beam of the base station.

The UE may report (transmit) a measurement result for the beam management by using a PUCCH or a PUSCH. The measurement result may be, for example, CSI including at least one of the L1-RSRP, L1-RSRQ, L1-SINR, L1-SNR, and the like. The measurement result may be referred to as beam measurement, a beam measurement result, a beam report, a beam measurement report, or the like.

CSI measurement for the beam report may include interference measurement. The UE may measure channel quality, interference, and the like by using a CSI measurement resource to derive the beam report. The CSI measurement resource may be, for example, at least one of an SS/PBCH block resource, a CSI-RS resource, another reference signal resource, and the like. Configuration information of CSI measurement report may be configured for the UE by using higher layer signaling.

The beam report may include a result of at least one of channel quality measurement and interference measurement. The result of the channel quality measurement may include, for example, the L1-RSRP. The result of the interference measurement may include the L1-SINR, L1-SNR, L1-RSRQ, other interference-related indicators (for example, an arbitrary indicator other than the L1-RSRP), and the like.

Note that the CSI measurement resource for the beam management may be referred to as a beam measurement resource. A signal/channel as a target for the CSI measurement may be referred to as a beam measurement signal. The CSI measurement/reporting may be interpreted as at least one of measurement/reporting for beam management, beam measurement/reporting, radio link quality measurement/reporting, and the like.

CSI report configuration information with consideration of beam management in existing NR is included in an RRC information element "CSI-ReportConfig." Information in the RRC information element "CSI-ReportConfig" will be described.

The CSI report configuration information (CSI-ReportConfig) may include report quantity information (which may be represented by "report quantity" or an RRC parameter "reportQuantity") that is information about parameters to be reported. The report quantity information is defined by an ASN.1 object type "choice type (choice)." Thus, one of parameters (cri-RSRP, ssb-Index-RSRP, and the like) defined as the report quantity information is configured.

For each report configuration, the UE for which a higher layer parameter (for example, an RRC parameter "groupBasedBeamReporting") included in the CSI report configuration information has been configured to "enabled" may include, in a beam report, a plurality of beam measurement resource IDs (for example, SSBRIs and CRIs) and a plurality of measurement results (for example, L1-RSRP) corresponding to these.

For each report configuration, the UE for which the number of reported target RS resources being one or more has been configured by a higher layer parameter (for example, an RRC parameter "nrofReportedRS") included in the CSI report configuration information may include, in a beam report, one or more beam measurement resource IDs and one or more measurement results (for example, L1-RSRP) corresponding to these.

(TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (expressed as a signal/channel) in a UE based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the RS to have the QCL relationship (RS relation information) and information indicating a QCL type (QCL type information). The RS relation information may include information such as an index of the RS (for example, an SSB index, or a non-zero power CSI-RS (NZP CSI-RS) resource ID (Identifier)), an index of a cell in which the RS is located, and an index of a Bandwidth Part (BWP) in which the RS is located.

In Rel-15 NR, as the TCI state for at least one of the PDCCH and PDSCH, both an RS of QCL type A and an RS of QCL type D or only the RS of QCL type A can be configured for the UE.

When the TRS is configured as the RS of QCL type A, it is assumed that the TRS is different from a demodulation reference signal (DMRS) for the PDCCH or PDSCH and the same TRS is periodically transmitted for a long time. The UE can calculate an average delay, a delay spread, and the like by measuring the TRS.

The UE for which the TRS has been configured as the RS of QCL type A with respect to a TCI state for the DMRS for the PDCCH or PDSCH can assume that parameters of QCL type A (average delays, delay spreads, and the like) of the DMRS for the PDCCH or PDSCH and the TRS are the same, and thus can obtain parameters of type A (an average delay, a delay spread, and the like) of the DMRS for the PDCCH or PDSCH on the basis of a measurement result of the TRS. When performing a channel estimation of at least one of the PDCCH and PDSCH, the UE can perform the channel estimation with higher accuracy by using the measurement result of the TRS.

The UE for which the RS of QCL type D has been configured can determine a UE receive beam (spatial domain reception filter, UE spatial domain reception filter) by using the RS of QCL type D.

An RS of QCL type X in a TCI state may mean an RS being in a QCL type X relationship with (a DMRS of) a certain channel/signal, and this RS may be referred to as a QCL source of QCL type X in the TCI state.

(Multi-TRP)

For NR, one or a plurality of transmission/reception points (TRPs) (multiple TRPs) that perform DL transmission to a UE by using one or a plurality of panels (multiple panels) are under study. Also, the UE that performs UL transmission to one or the plurality of TRPs is under study.

Note that the plurality of TRPs may correspond to the same cell identifier (ID), or may correspond to different cell IDs. The cell ID may be a physical cell ID, or may be a virtual cell ID.

FIGS. 1A to 1D are each a diagram to show an example of a multi-TRP scenario. In these examples, it is assumed that each TRP can transmit four different beams, but this is not restrictive.

FIG. 1A shows an example of a case where only one TRP (in the present example, TRP 1) out of the multiple TRPs performs transmission to the UE (which may be referred to as a single mode, a single TRP, or the like). In this case, TRP 1 transmits both a control signal (PDCCH) and a data signal (PDSCH) to the UE.

Figure 1B:
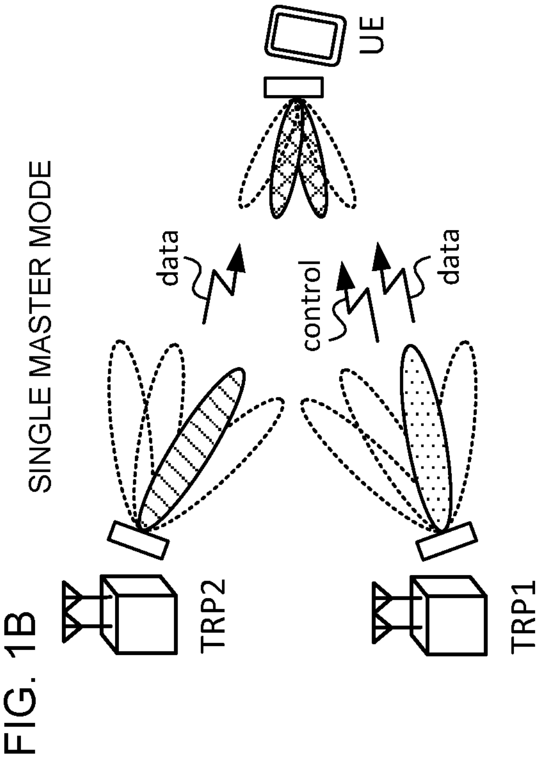

FIG. 1B shows an example of a case (which may be referred to as a single master mode) in which only one TRP (in the present example, TRP 1) out of multiple TRPs transmits a control signal to the UE, and the multiple TRPs transmits data signals. The UE receives, on the basis of one piece of downlink control information (DCI), respective PDSCHs transmitted from the multiple TRPs.

Figure 1C:
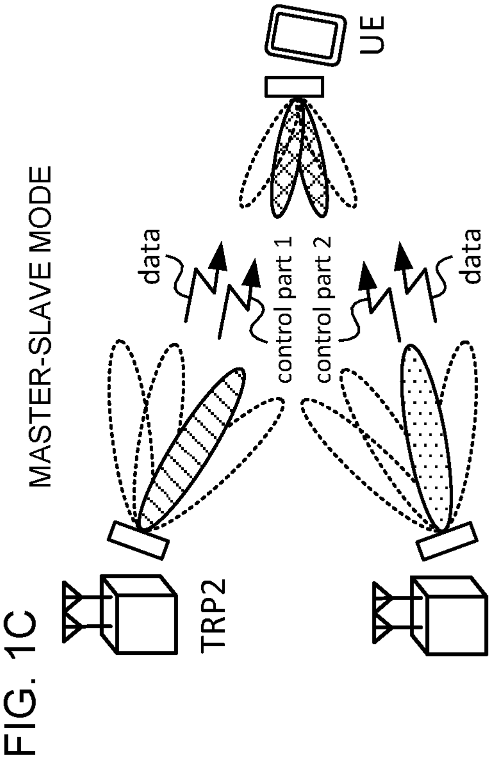

FIG. 1C shows an example of a case (which may be referred to as a master-slave mode) in which each of multiple TRPs transmits part of a control signal to the UE, and the multiple TRPs transmit data signals. Part 1 of the control signal (DCI) may be transmitted by TRP 1, and part 2 of the control signal (DCI) may be transmitted by TRP 2. Part 2 of the control signal may depend on part 1. The UE receives, on the basis of these parts of the DCI, respective PDSCHs transmitted from the multiple TRPs.

Figure 1D:
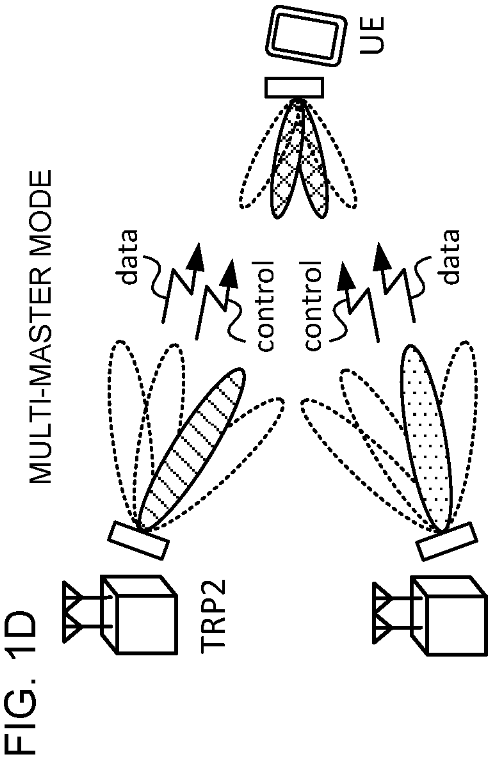

FIG. 1D shows an example of a case (which may be referred to as a multi-master mode) in which each of multiple TRPs transmits a separate control signal to the UE, and the multiple TRPs transmit data signals. A first control signal (DCI) may be transmitted by TRP 1, and a second control signal (DCI) may be transmitted by TRP 2. The UE receives, on the basis of these pieces of DCI, respective PDSCHs transmitted from the multiple TRPs.

When a plurality of PDSCHs (which may be referred to as multiple PDSCHs) from the multiple TRPs as shown in FIG. 1B are scheduled by using one piece of DCI, the piece of DCI may be referred to as single-DCI (single PDCCH). When a plurality of PDSCHs from the multiple TRPs as shown in FIG. 1D are scheduled by using a plurality of respective pieces of DCI, these plurality of pieces of DCI may be referred to as multi-DCI (multiple PDCCHs).

From each TRP of the multiple TRPs, a different code word (CW) and a different layer may be transmitted. As one mode of the multi-TRP transmission, non-coherent joint transmission (NCJT) is under study.

In the NCJT, for example, TRP 1 performs modulation mapping of a first code word, and performs layer mapping so as to transmit a first PDSCH by using first precoding for a first number of layers (for example, two layers). TRP 2 performs modulation mapping of a second code word, and performs layer mapping so as to transmit a second PDSCH by using second precoding for a second number of layers (for example, two layers).

Note that a plurality of PDSCHs (multiple PDSCHs) transmitted by NCJT may be defined as partially or fully overlapping in at least one of time and frequency domains. In other words, a first PDSCH from a first TRP and a second PDSCH from a second TRP may overlap with each other in at least one of time and frequency resources.

It may be assumed that these first PDSCH and second PDSCH are not in a relationship of quasi-co-location (QCL) (not quasi-co-located). Reception of the multiple PDSCHs may be interpreted as simultaneous reception of PDSCHs of a QCL type other than a certain QCL type (for example, QCL type D).

For URLLC with the multiple TRPs, support for PDSCH (transport block (TB) or code word (CW)) repetition over the multiple TRPs is under study. Support for repetition schemes (URLLC schemes, for example, schemes 1, 2a, 2b, 3, and 4) over the multiple TRPs on a frequency domain, a layer (spatial) domain, or a time domain is under study. In scheme 1, multiple PDSCHs from the multiple TRPs are space division multiplexed (SDMed). In scheme 2a and scheme 2b, PDSCHs from the multiple TRPs are frequency division multiplexed (FDMed). In scheme 2a, redundancy versions (RVs) for the multiple TRPs are the same. In scheme 2b, the RVs for the multiple TRPs may be the same, or may be different from each other. In scheme 3 and scheme 4, the multiple PDSCHs from the multiple TRPs are time division multiplexed (TDMed). In scheme 3, the multiple PDSCHs from the multiple TRPs are transmitted in one slot. In scheme 4, the multiple PDSCHs from the multiple TRPs are transmitted in different slots.

According to such a multi-TRP scenario, more flexible transmission control using channels with satisfactory quality can be performed.

In the multi-master mode as shown in FIG. 1D, a structure in which the same physical cell ID is configured for the plurality of TRPs (intra-TRP mobility, intra-cell TRP mobility, intra-cell mobility, or intra-cell multi-TRP operation) and a structure in which different physical cell IDs are configured for the plurality of TRPs (inter-TRP mobility, inter-cell TRP mobility, inter-cell mobility, or inter-cell multi-TRP operation) are conceivable.

Figure 2A:
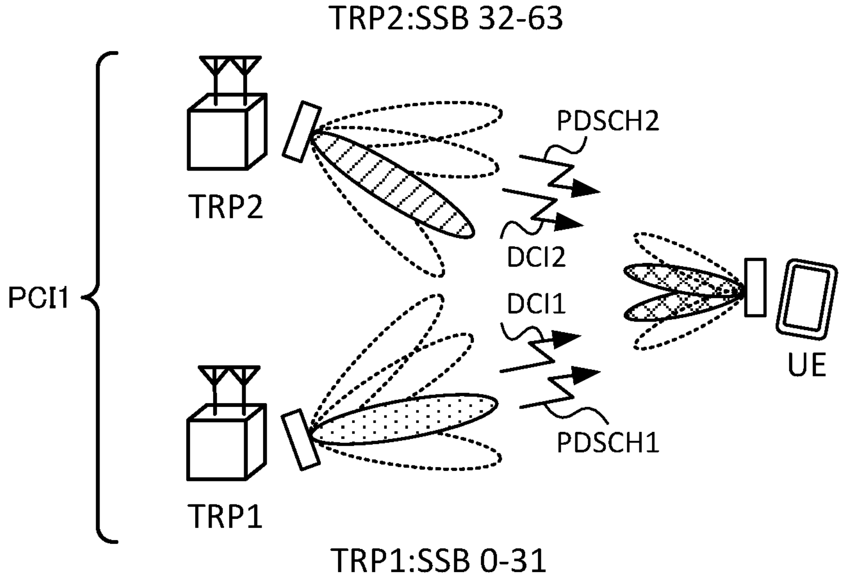
FIG. 2A is a diagram to show an example of an intra-cell TRP.

FIG. 2A is a diagram to show an example of the intra-cell mobility. As shown in FIG. 2A, the same physical cell ID (PCI 1) is configured for TRP 1 and TRP 2. This case requires that SSBs (SSBindex) transmitted by TRP 1 and SSBs transmitted by TRP 2 are different from each other. In the example of FIG. 2A, the SSBs of TRP 1 are 0 to 31, and the SSBs of TRP 2 are 32 to 63.

Figure 2B:
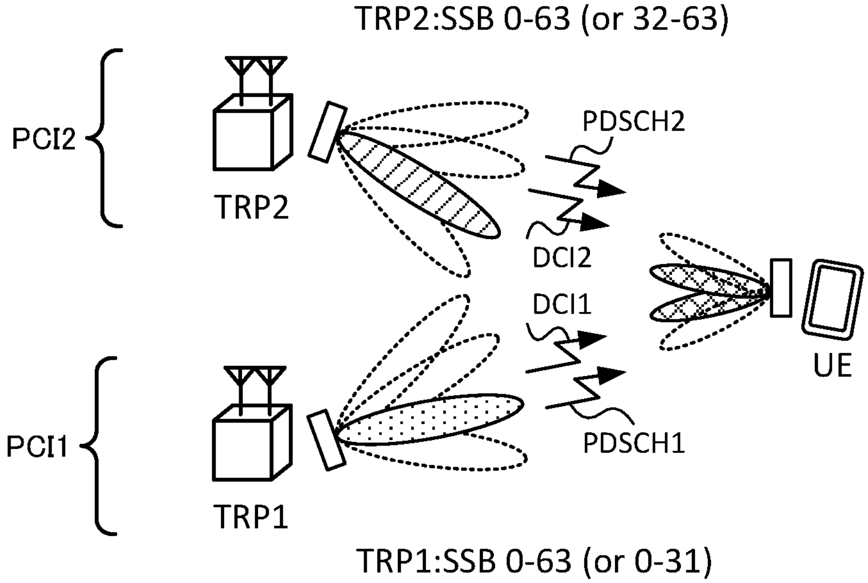
FIG. 2B is a diagram to show an example of an inter TRP.

FIG. 2B is a diagram to show an example of the inter-cell mobility. As shown in FIG. 2B, different physical cell IDs (PCI 1 and PCI 2) are configured for TRP 1 and TRP 2. In this case, SSBs transmitted by TRP 1 and SSBs transmitted by TRP 2 may overlap with each other, or may be different from each other. In the example of FIG. 2B, both the SSBs of TRP 1 and the SSBs of TRP 2 may be 0 to 63. Alternatively, the SSBs of TRP 1 may be 0 to 31, and the SSBs of TRP 2 may be 32 to 63. In this case, an RS in a TCI state for PDSCH 1/PDSCH 2 is PCI 1 or PCI 2.

(Example of New RRC Configuration)

When different physical cell IDs are configured for a plurality of TRPs, the UE may receive information related to a downlink reference signal (DL RS) from the second TRP out of the plurality of TRPs by using higher layer signaling (RRC), and may control UL signal transmission on the basis of the information. The information may include, for example, "trp-ToAddModList," "trp-ToReleaseList," "physCellId" (physical cell ID), "TRP-ID," and the like mentioned below. "TRP-ID" may be an identifier (ID) of the second TRP.

FIG. 3 is a diagram to show a first configuration example of RRC. In the diagram shown in FIG. 3, an RRC parameter "ServingCellConfig" includes "trp-ToAddModList" indicating a list of TRPs to be added or changed, "trp-ToReleaseList" indicating a list of TRPs to be released, and the like. An RRC parameter "TRP-Config" includes "TRP-ID," "physCellId," information related to an SSB (positions of the SSB (for example, "ssb-PositionsInBurst")), a periodicity of an SSB (for example, "ssb-periodicityServingCell"), and the like.

"ServingCellConfig" in the present disclosure may be interpreted as "ServingCellConfigCommon." For example, a TRP ID of a serving cell corresponding to "ServingCellConfig" may be 0, and a TRP-ID for another TRP (additional TRP) starting from 1 may be configured for "trp-Config." The TRP-ID of the second TRP may be 1. Note that in FIG. 3, a part of "trp-ToAddModList" in "ServingCellConfig" may include contents of "TRP-Config" ("TRP-ID," "physCellId," information related to an SSB, and the like).

FIG. 4 is a diagram to show a second configuration example of RRC. In the diagram shown in FIG. 4, a QCL information-related RRC parameter "QCL-Info-r17" includes "trp" ("TRP-ID") and the like. In the present disclosure, "QCL-Info-r17" may be interpreted as "QCL-Info" or "SpatialRelationInfo." In the present disclosure, "r17" indicates 3GPP Rel. 17, but may be another name indicating another release other than Rel. 15/16. QCL configuration indicated by "QCL-Info-r17" may correspond to each TRP of the serving cell (each TRP ID). When received "TRP-ID" is 0, the UE may judge that the received "TRP-ID" means an original (its own) serving cell.

An RS transmitted from an added TRP may be a source RS for QCL/spatial relation information. "QCL-Info-r17" may be configured for all BWPs of the serving cell. In "ServingCellConfig," information related to the plurality of TRPs may be configured.

According to the configuration described above, even when different physical cell IDs are configured for the plurality of TRPs, the UE can perform appropriate communication by receiving information related to a TRP of the serving cell.

(SSB and Physical Cell ID of Non-Serving Cell)

The UE may receive at least one of SSB-related information (SSB index) and a physical cell ID of a non-serving cell (the second TRP) used for configuration of TCI state/spatial relation information. The SSB may be configured as the source RS for QCL/spatial relation information. At least one of the SSB-related information and the physical cell ID of the non-serving cell (second TRP) is an example of information related to a downlink reference signal from the second TRP.

The source RS means an RS to have a QCL relationship with a channel/signal for which a UL TCI state is configured (specified) (which may be referred to as a target channel/RS), and, for example, may be a DL RS (for example, an SSB, a CSI-RS, a TRS, or the like), or may be a UL RS (for example, an SRS, an SRS for beam management, or the like).

An arbitrary target RS may be configured together with a TCI state for the SSB of the non-serving cell. A limited target RS (for example, only a TRS) may be configured together with the TCI state for the SSB of the non-serving cell.

The SSB of the non-serving cell may be configured for CSI (L1) measurement/radio link monitoring (RLM)/beam failure detection (BFD).

FIG. 5 is a diagram to show a third configuration example of RRC. As shown in FIG. 5, an RRC parameter "QCL-Info" includes "ssb-index," "physCellId," and the like. These "ssb-index" and "physCellId" are examples of the above-mentioned SSB-related information and physical cell ID of the non-serving cell, respectively.

The SSB of the non-serving cell may be used for distinguishing only a PDCCH/PDSCH from the second TRP. The SSB of the non-serving cell may be used for distinguishing only a PDCCH/PDSCH and L1-RSRP/SINR beam report from the second TRP. The SSB of the non-serving cell may be used for distinguishing only a PDCCH/PDSCH, L1-RSRP/SINR beam report, and RLM from the second TRP.

DL transmission by the multiple TRPs is configured for each BWP, and thus there is a possibility that, in a certain UE, the second TRPs corresponding to different BWPs are different from each other. However, because "QCL-Info" and "SpatialRelationInfo" in FIG. 5 are configurations for each BWP, redundant configuration for each cell is unnecessary, and thus the configuration can be performed efficiently.

Figure 6:
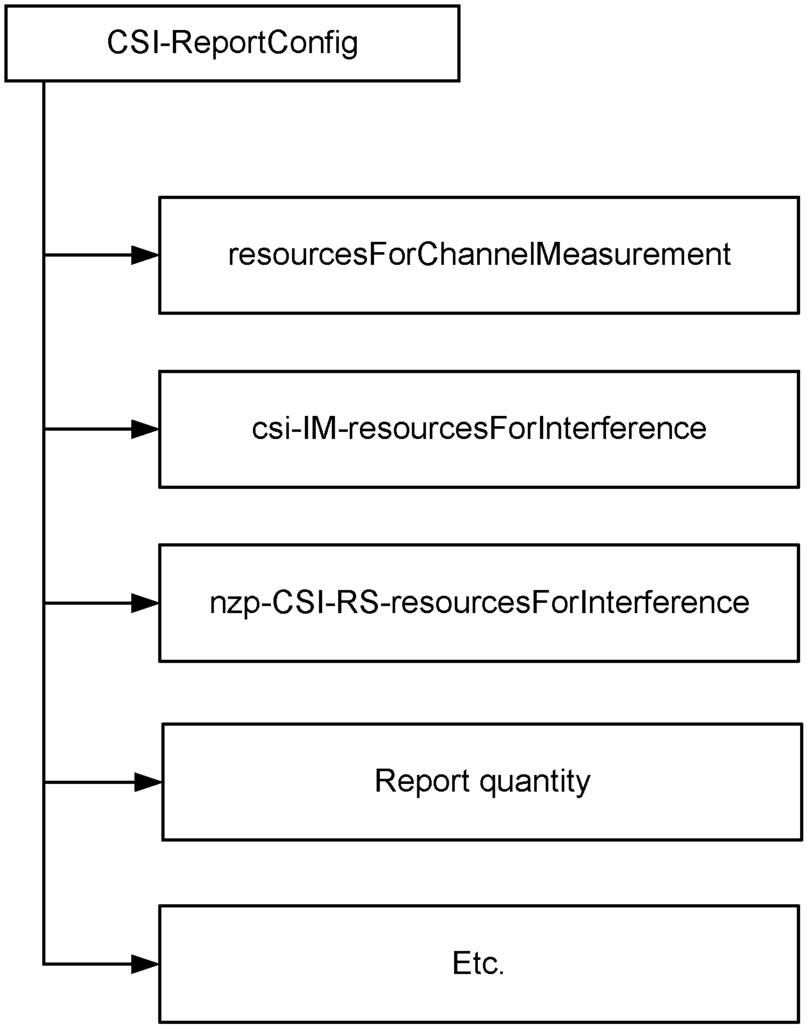
FIG. 6 is a diagram to show an overview of CSI report configuration in RRC.

FIG. 6 is a diagram to show an overview of CSI report configuration in RRC. FIG. 6 shows CSI report configuration in RRC in 3GPP Rel. 15/16. As shown in FIG. 6, the CSI report configuration (CSI-ReportConfig) includes "resourcesForChannelMeasurement," ""csi-IM-resourcesForInterference," "nzp-CSI-RS-resourcesForInterference," "Report quantity," and the like. "resourcesForChannelMeasurement," ""csi-IM-resourcesForInterference," and "nzp-CSI-RS-resourcesForInterference" correspond to CSI resource configuration "CSI-ResourceConfig" (CSI-ResourceConfigId).

FIG. 7A is a diagram to show part of CSI resource configuration in RRC. FIG. 7B is a diagram to show part of a CSI-SSB resource set. FIGS. 7A and 7B show RRC configuration in 3GPP Rel. 15/16. As shown in FIG. 7A, the CSI resource configuration (CSI-ResourceConfig) includes "CSI-SSB-ResourceSetId." As shown in FIG. 7B, the CSI-SSB-resource set (CSI-SSB-ResourceSet) includes "CSI-SSB-ResourceSetId" and "SSB-Index."

However, for NR specifications thus far, L1 (Layer 1) CSI reporting with the SSB of the non-serving cell has not been fully studied. For example, a relationship between L1 CSI reporting in a serving cell and L1 CSI reporting in a non-serving cell has not been fully studied. Also, configuration signaling (for example, RRC) for the L1 CSI reporting in the non-serving cell has not been fully studied.

Thus, the inventors of the present invention came up with the idea of a terminal that can appropriately perform L1 CSI reporting for a non-serving cell (and a serving cell).

Embodiments according to the present disclosure will be described in detail with reference to the drawings as follows. The radio communication methods according to respective embodiments may each be employed individually, or may be employed in combination.

In the present disclosure, L1 CSI reporting, L1 beam reporting, CSI reporting, and beam reporting may be interchangeably interpreted. Reporting and measurement may be interchangeably interpreted. The L1 CSI reporting may be interpreted as measurement of L1-RSRP/L1-RSRQ/L1-SINR/L1-SNR or reporting/CSI reporting including L1-RSRP/L1-RSRQ/L1-SINR/L1-SNR.

Note that in the present disclosure, a panel, an Uplink (UL) transmission entity, a TRP, a TRP-ID, a TRP ID, a spatial relation, a control resource set (COntrol REsource SET (CORESET)), a PDSCH, a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), and a CORESET pool may be interchangeably interpreted. A panel Identifier (ID) and a panel may be interchangeably interpreted.

In the present disclosure, a cell, a CC, a carrier, a BWP, and a band may be interchangeably interpreted.

In the present disclosure, an index, an ID, an indicator, and a resource ID may be interchangeably interpreted.

Embodiments according to the present disclosure will be described in detail with reference to the drawings as follows. The radio communication methods according to respective embodiments may each be employed individually, or may be employed in combination. Note that in the present disclosure, "A/B" may be interpreted as "at least one of A and B." (Radio Communication Method)

First Embodiment

For each of an RS of a serving cell and an RS of a non-serving cell, individual (separate) channel state information (CSI) report configurations (CSI-ReportConfig) may be configured. For example, when a synchronization signal block (SSB) is configured for L1 CSI reporting by using CSI-ReportConfig, the RS may be the SSB. CSI resource configuration (CSI-ResourceConfig) may be configured together with an RS (SSB) from only the serving cell or an RS (SSB) from only the non-serving cell. The CSI resource configuration may be configured together with NZP-CSI-RS resource configuration.

In the present disclosure, CSI report configuration (CSI-ReportConfig), CSI resource configuration (CSI-ResourceConfig), and a CSI-SSB resource set (CSI-SSB-ResourceSet) may be interchangeably interpreted.

Using the individual CSI report configuration enables the SSB of the serving cell and the SSB of the non-serving cell to be distinguished from each other. For example, when specific SSB index=1 (#1) is configured, SSB #1 of the serving cell and SSB #1 of the non-serving cell are different from each other. In such a case, the UE can distinguish between the SSB of the serving cell and the SSB of the non-serving cell.

FIG. 8 is a diagram to show an example of CSI-SSB-ResourceSet in a first embodiment. As shown in FIG. 8, as an RRC parameter, "new ID" (recreation of an index of the non-serving cell) or "physCellId" may be configured in CSI-SSB-ResourceSet, and all SSBs in CSI-SSB-ResourceSet may indicate an SSB from the non-serving cell. "newID"/"physCellId" corresponds to TRP-ID/physCellId. TRP-ID/physCellId may correspond to "TRP-ID" of FIG. 3 and FIG. 4, and "physCellId" of FIG. 3 and FIG. 5. Configuration related to measurement of an SSB of a different non-serving cell may be configured in different CSI-SSB-ResourceSet/CSI-ResourceConfig.

1 bit is used for "newID" when "newID" indicates, for example, a serving cell and one non-serving cell. 2 bits are used for "newID" when "newID" indicates, for example, a serving cell, non-serving cell #1, non-serving cell #2, and non-serving cell #3. A greater number of bits may be used for "newID" depending on the number of supported non-serving cells.

An advantage of configuration of "newID" compared to direct configuration of "physCellId" (PCI) will be described. Directly configuring the PCI in QCL/TCI state increases RRC overhead. The number of bits in RRC signaling for one PCI is 10 bits. When 64 TCI state configurations from a non-serving cell are present, 640 bits are used. Furthermore, when an SSB of the non-serving cell is configured in L1 CSI reporting, 10 bits are used for each channel measurement resource (CMR) of the SSB of the non-serving cell. In other words, the total overhead is not small. On the other hand, when "newID" is used and only one non-serving cell is present, only 1 bit is used for indicating the non-serving cell. Accordingly, signaling overhead can be suppressed. A relationship between "newID" and "physCellId" may be defined by configuration/specifications.

Second Embodiment

An RS (for example, SSB) of a serving cell and an RS (for example, SSB) of a non-serving cell may be configured in the same CSI report configuration (CSI-ReportConfig) and the same CSI resource configuration (CSI-ResourceConfig). In other words, both the RS of the serving cell and the RS of the non-serving cell may be included in one CSI report configuration and one CSI resource configuration.

[Aspect 2-1]

FIG. 9 is a diagram to show an example of CSI-SSB-ResourceSet in aspect 2-1. As a higher layer (RRC) parameter received by a UE, csi-SSB-ResourceList of CSI-SSB-ResourceSet may include SSB-Index from the serving cell or SSB-Index from the non-serving cell.

For each SSB index, "new ID" (recreation of an index of the non-serving cell) or a (direct) PCI may be added. Alternatively, a sequence ("newIDsequence") such as a bitmap indicating "new ID" may be added, and each bit (bit location in the sequence) may be mapped to each of SSBs (locations of SSB indexes in csi-SSB-ResourceList) in one-to-one correspondence.

Alternatively, SSBs from different cells as different CMR groups may be added in specific order. Alternatively, SSB-Index from the serving cell or SSB-Index from the non-serving cell may be configured by another format.

The first CMR group in csi-SSB-ResourceList may mean the serving cell, and the remaining CMR may mean the non-serving cell. For example, X (the first X) CMRs from the first (or the first group (CMR group) having new ID/PCI) may mean the serving cell, the next Y (second Y) CMRs (or the second group (CMR group) having new ID/PCI) may mean non-serving cell #i, and the next Z (third Z) CMRs (or the third group (CMR group) having new ID/PCI) may mean non-serving cell #j.

In FIG. 9, for example, when a sequence ("newIDsequence")=(0, 1, 0, 1) such as a bitmap indicating SSB indexes=(1, 5, 8, 30) and new ID is configured, serving cell SSB #1, non-serving cell SSB #5, serving cell SSB #8, and non-serving cell SSB #30 may be indicated. In other words, new ID=0 may indicate the serving cell, and new ID=1 may indicate the non-serving cell.

A plurality of combinations of one csi-SSB-Resource (one SSB index in csi-SSB-ResourceList) and one new ID/PCI (one new ID/PCI in newIDsequence) may be configured. For example, in place of csi-SSB-ResourceList (1, 5, 8, 30) and newIDsequence (0, 1, 0, 1) in the example of FIG. 9, a list (sequence) of combinations that are (1, 0), (5, 1), (8, 0), and (30, 1) may be configured.

[Aspect 2-2]

In RRC signaling, CSI-SSB-ResourceSet includes SSBs from cells (for example, similarly to the first embodiment), and thus SSBs of a plurality of cells may be configured in a plurality of pieces of CSI-SSB-ResourceSet and included in CSI-ReportConfig (even in a case of periodic (P) CSI reporting/Semi-Persistent (SP) CSI reporting).

Others

As another report configuration, for example, reported beam numbers may be configured. For example, this configuration may be applied to CSI-ReportConfig regardless of whether SSBs from the serving cell or SSBs from the non-serving cell. Different parameters (beam numbers) may be configured/defined for the serving cell and the non-serving cell (for, for example, different CSI-SSB-ResourceSet in aspect 2-2). For example, up to one beam report may always be configured for each non-serving cell.

The first embodiment/second embodiment may be employed in beam reporting (CSI reporting) with only L1-RSRP or only L1-SINR. Alternatively, the first embodiment/second embodiment may be employed in beam reporting (CSI reporting) with both L1-RSRP and L1-SINR.

Third Embodiment

The first embodiment/second embodiment may be mainly employed in non-group-based CSI reporting (beam reporting). When group-based CSI reporting is applied, an RS (for example, SSB) of a serving cell and an RS (for example, SSB) of a non-serving cell may be configured in the same (one) CSI report configuration (CSI-ReportConfig) corresponding to different groups. The different groups (for example, two groups) may be configured in the same CSI-SSB-ResourceSet or in different CSI-SSB-ResourceSet in CSI-ResourceConfig.

<UE Capability>

A UE may transmit (report) at least one of (1) to (4) below as a UE capability (UE capability information).

(1) Whether to support configuration of non-serving cell SSB for L1 CSI reporting In this case, the UE may transmit the same or different UE capabilities depending on whether the CSI reporting is group-based reporting or non-group-based reporting.

(2) Whether to support configuration of non-serving cell SSB and serving cell SSB for L1 CSI reporting (for group-based/non-group-based CSI reporting) in CSI-ReportConfig/CSI-SSB-ResourceSet (3) Whether to support a plurality of pieces of CSI-SSB-ResourceSet (for example, different CSI-SSB-ResourceSet for SSBs from different cells) in CSI-ReportConfig for P CSI reporting/SP CSI reporting (4) Whether to support configuration of a plurality of non-serving cell SSBs for L1 CSI reporting in CSI-ReportConfig/CSI-ResourceConfig/CSI-SSB-ResourceSet (Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
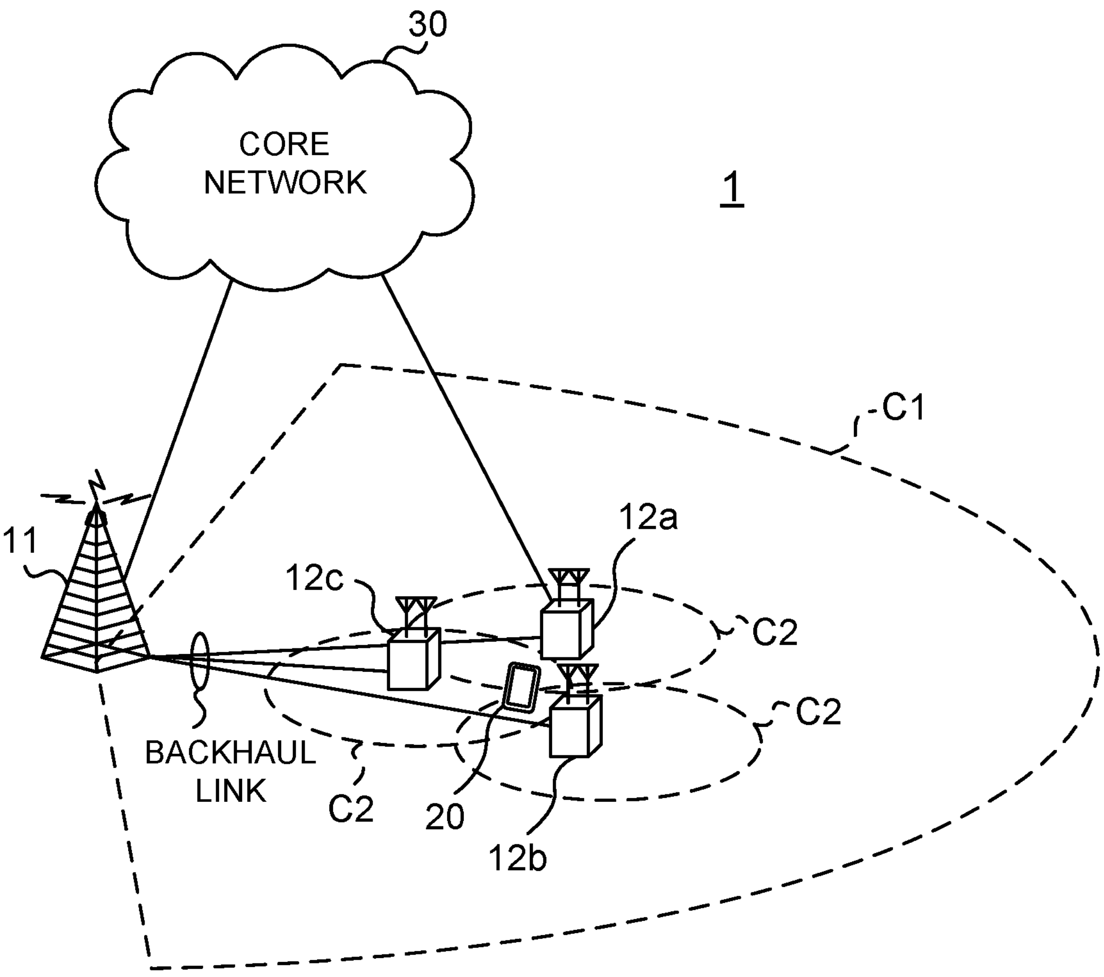
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
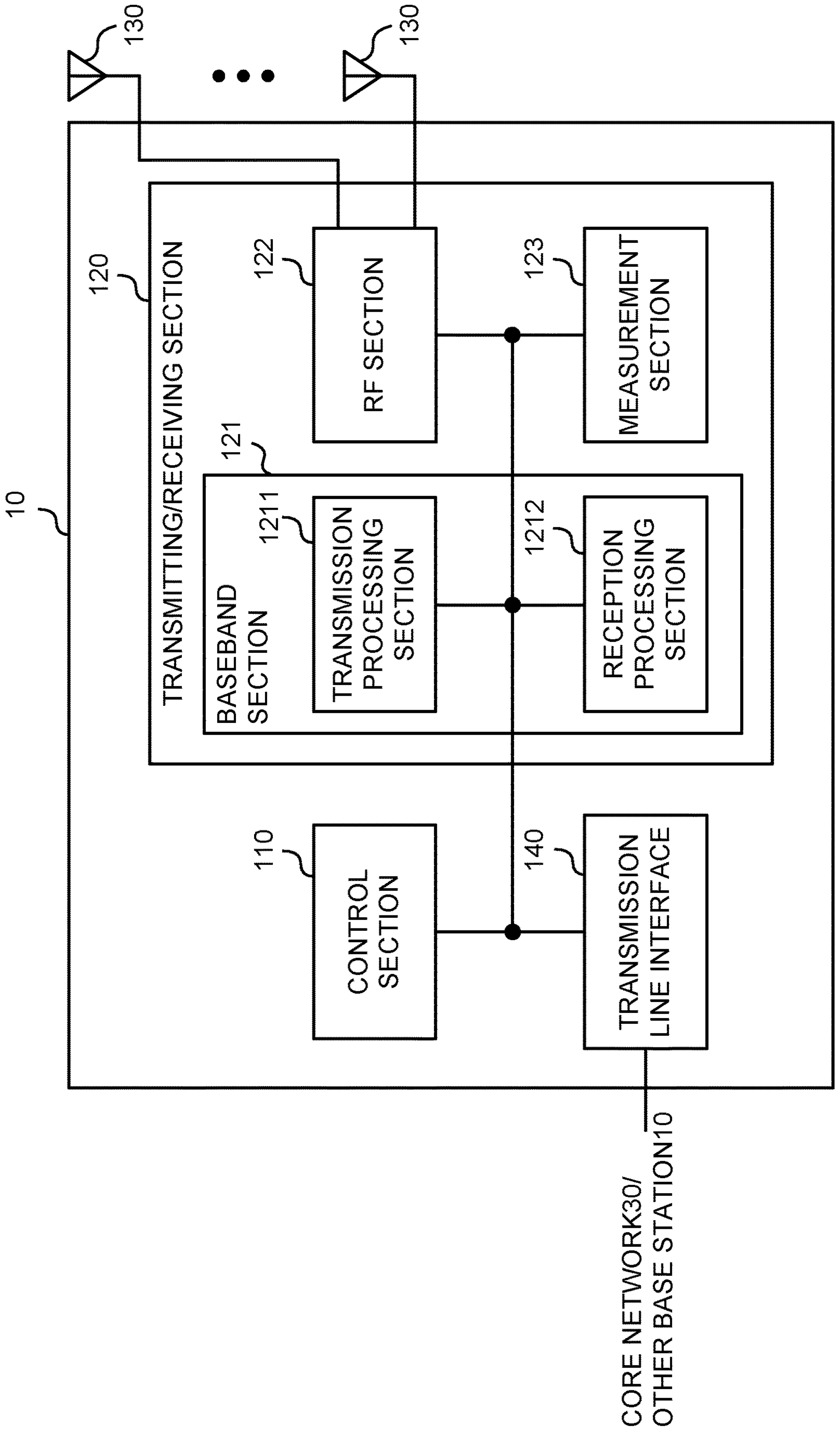
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit separate channel state information (CSI) report configurations for respective reference signals of a reference signal of a serving cell and a reference signal of a non-serving cell, or may transmit one CSI report configuration including both the reference signal of the serving cell and the reference signal of the non-serving cell. The transmitting/receiving section 120 may receive a CSI report based on the separate CSI report configurations or the one CSI report configuration.

(User Terminal)

Figure 12:
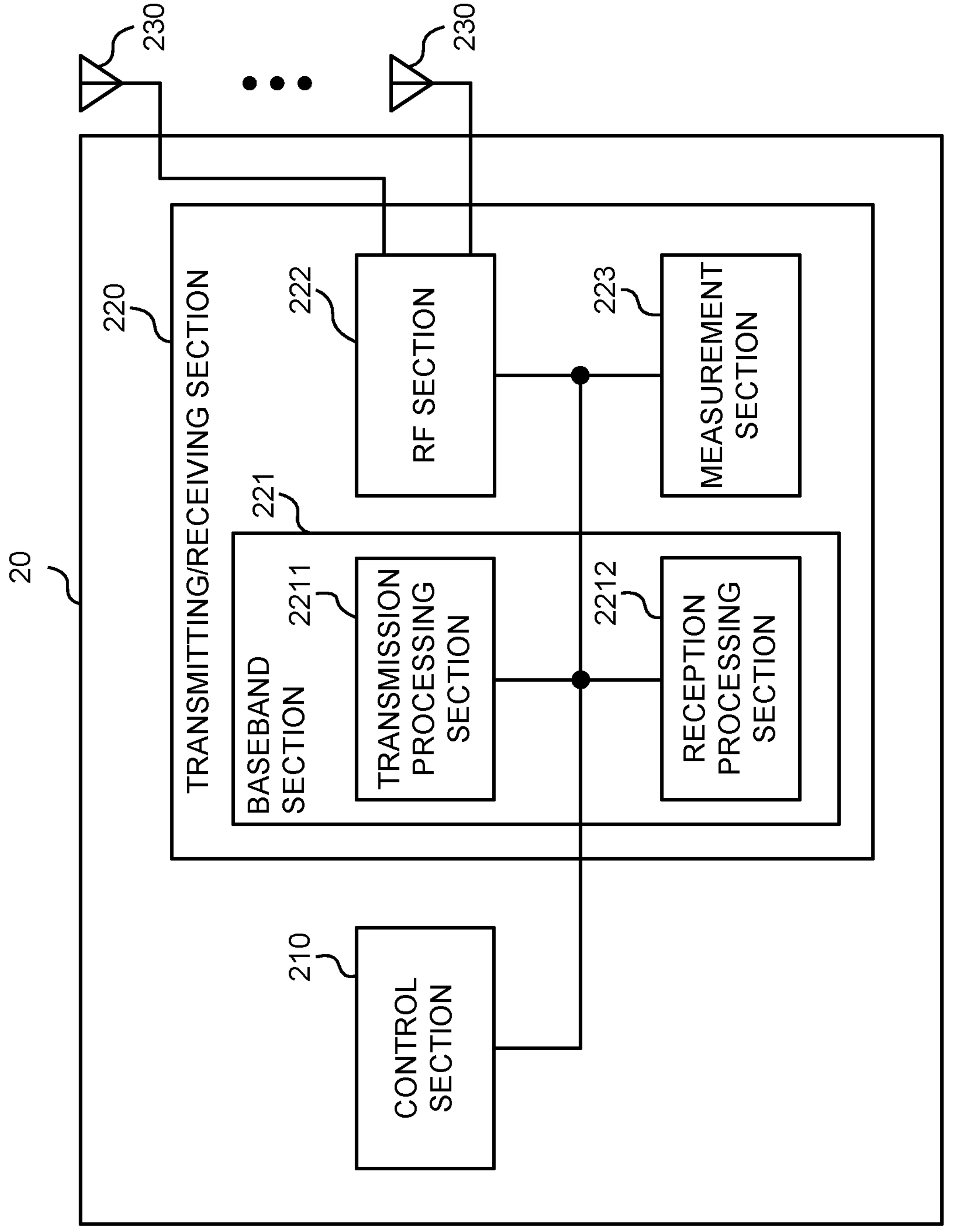
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether or not to apply DFT processing may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive separate channel state information (CSI) report configurations for respective reference signals of a reference signal of a serving cell and a reference signal of a non-serving cell, or may receive one CSI report configuration including both the reference signal of the serving cell and the reference signal of the non-serving cell.

When the transmitting/receiving section 220 receives the separate CSI report configurations, CSI resource configuration may be configured together with the reference signal from only the serving cell or the reference signal from only the non-serving cell.

When the transmitting/receiving section 220 receives the one CSI report configuration, the transmitting/receiving section 220 may receive a higher layer parameter including an index of the reference signal from the serving cell or an index of the reference signal from the non-serving cell.

When group-based CSI reporting is applied, the transmitting/receiving section 220 may receive one CSI report configuration in which the reference signal of the serving cell and the reference signal of the non-serving cell are configured, the one CSI report configuration corresponding to different groups.

The control section 210 may control CSI reporting on the basis of the separate CSI report configurations or the one CSI report configuration.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
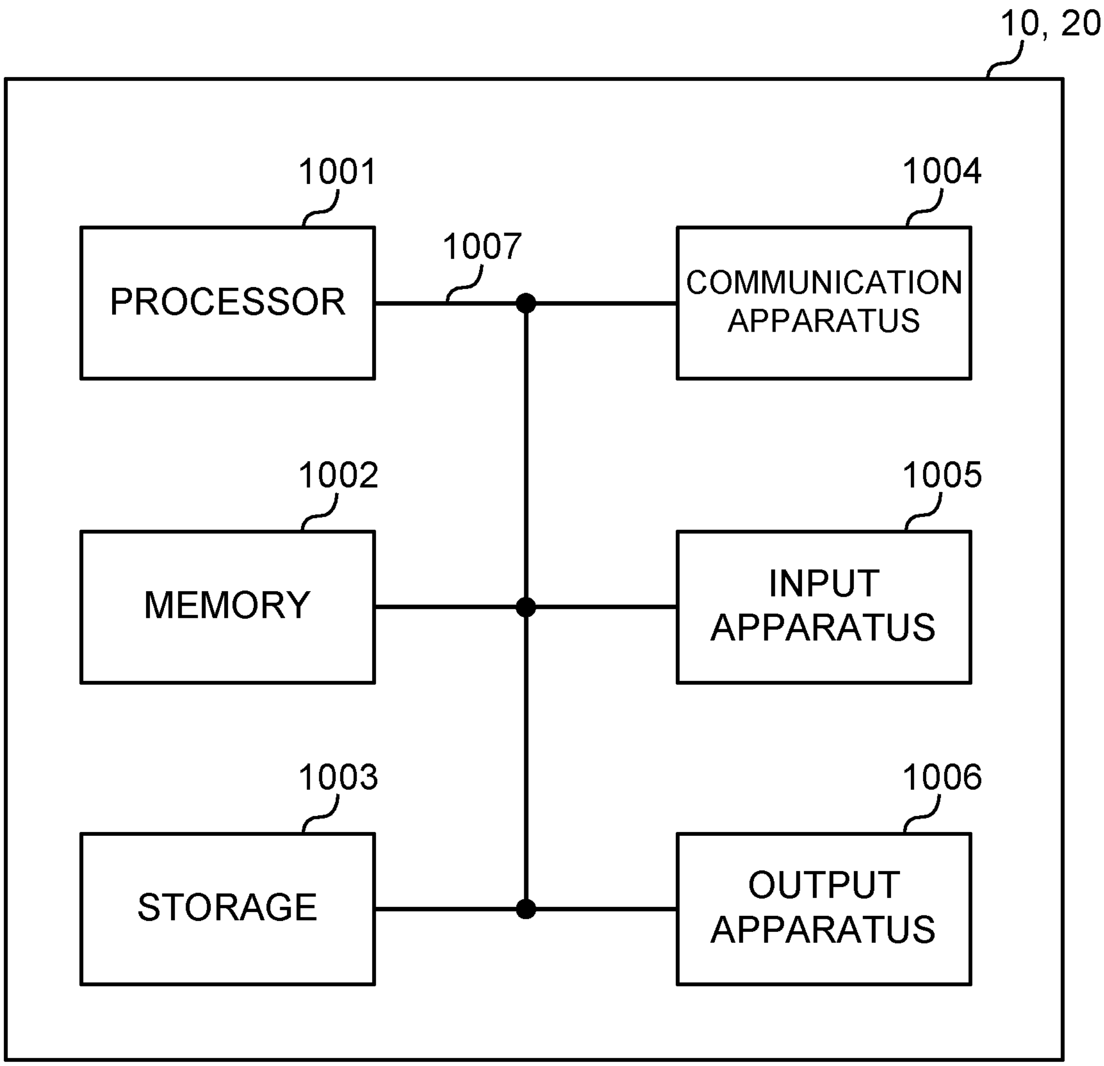
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a “register,” a “cache,” a “main memory (primary storage apparatus)” and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as “secondary storage apparatus.”

The communication apparatus 1004 is hardware (transmitting/receiving device) for allowing inter-computer communication via at least one of wired and wireless networks, and may be referred to as, for example, a “network device,” a “network controller,” a “network card,” a “communication module,” and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a “channel,” a “symbol,” and a “signal” (or signaling) may be interchangeably interpreted. Also, “signals” may be “messages.” A reference signal may be abbreviated as an “RS,” and may be referred to as a “pilot,” a “pilot signal,” and so on, depending on which standard applies. Furthermore, a “component carrier (CC)” may be referred to as a “cell,” a “frequency carrier,” a “carrier frequency” and so on.

A radio frame may be constituted of one or a plurality of periods (frames) in the time domain. Each of one or a plurality of periods (frames) constituting a radio frame may be referred to as a “subframe.” Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2021-12255 filed on Jan. 28, 2021. The entire contents of the application are incorporated herein.

What is claimed is:

1. A terminal comprising:

a receiver that receives one channel state information (CSI) resource configuration related to one parameter that corresponds to a synchronization signal block (SSB) associated with a physical cell ID (PCI) of a serving cell when a value of the one parameter is 0, and corresponds to an SSB associated with a PCI of a non-serving cell when the value of the one parameter is other than 0;

a processor that controls CSI reporting based on the one CSI resource configuration; and a transmitter that transmits capability information indicating support of a configuration of the SSB of the non-serving cell corresponding to the CSI reporting.

2. A radio communication method for a terminal, comprising:

receiving one channel state information (CSI) resource configuration related to one parameter that corresponds to a synchronization signal block (SSB) associated with a physical cell ID (PCI) of a serving cell when a value of the one parameter is 0, and corresponds to an SSB associated with a PCI of a non-serving cell when the value of the one parameter is other than 0;

controlling CSI reporting based on the one CSI resource configuration; and transmitting capability information indicating support of a configuration of the SSB of the non-serving cell corresponding to the CSI reporting.

3. A base station comprising:

a transmitter that transmits one channel state information (CSI) resource configuration related to one parameter that corresponds to a synchronization signal block (SSB) associated with a physical cell ID (PCI) of a serving cell when a value of the one parameter is 0, and corresponds to an SSB associated with a PCI of a non-serving cell when the value of the one parameter is other than 0;

a processor that controls reception of CSI reporting based on the one CSI resource configuration; and a receiving section that receives capability information indicating support of a configuration of the SSB of the non-serving cell corresponding to the CSI reporting.

4. A system comprising a terminal and a base station, wherein the terminal comprises:

a receiver that receives one channel state information (CSI) resource configuration related to one parameter that corresponds to a synchronization signal block (SSB) associated with a physical cell ID (PCI) of a serving cell when a value of the one parameter is 0, and corresponds to an SSB associated with a PCI of a non-serving cell when the value of the one parameter is other than 0;

a processor that controls CSI reporting based on the one CSI resource configuration; and a transmitter that transmits capability information indicating support of a configuration of the SSB of the non-serving cell corresponding to the CSI reporting, and the base station comprises:

a processor that controls reception of the CSI reporting.

* * * * *